United States Patent
Chin et al.

(10) Patent No.: US 7,049,774 B2
(45) Date of Patent: May 23, 2006

(54) APPARATUS FOR CONTROLLING POWER FACTOR COMPENSATION IN INVERTER CONTROL CIRCUIT AND METHOD THEREOF

(75) Inventors: Sim Won Chin, Gwangmyeong-si (KR); Sung Yeob Lim, Gimhae-si (KR); Deok Huh, Bucheon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/037,296

(22) Filed: Jan. 19, 2005

(65) Prior Publication Data

US 2005/0258793 A1    Nov. 24, 2005

(30) Foreign Application Priority Data

May 21, 2004    (KR)    .................. 10-2004-0036419

(51) Int. Cl.
*G05F 1/70* (2006.01)
(52) U.S. Cl. .................. 318/438; 318/508; 318/509; 318/510; 318/512; 318/729; 323/205; 323/212
(58) Field of Classification Search ................ 318/438, 318/729, 508–510, 512; 323/205, 212
See application file for complete search history.

(56) References Cited

U.S. PATENT DOCUMENTS

| | | | |
|---|---|---|---|
| 6,181,583 B1* | 1/2001 | Okui et al. | 363/45 |
| 6,489,742 B1* | 12/2002 | Lumsden | 318/727 |
| 6,856,119 B1* | 2/2005 | Crawford | 320/166 |

* cited by examiner

*Primary Examiner*—Rita Leykin
(74) *Attorney, Agent, or Firm*—Birch Stewart Kolasch & Birch LLP

(57) ABSTRACT

The present invention provides an apparatus for controlling power factor compensation and method thereof, in which a turn-on timing point of a power factor compensation switch is delayed by a prescribed time from a zero crossing timing point to enhance a power factor. The present invention includes periodically detecting a zero crossing time point of an inputted voltage, turning on the power factor compensation switch if a turn-on time point of the power factor compensation switch set to a time point delayed by a prescribed time from the detected zero crossing time of the inputted voltage is reached, and turning off the power factor compensation switch if a prescribed time passes after turning on the power factor compensation switch.

10 Claims, 8 Drawing Sheets

APPARATUS FOR CONTROLLING POWER FACTOR COMPENSATION IN INVERTER CONTROL CIRCUIT AND METHOD THEREOF

BACKGROUND OF THE INVENTION

1. Field of the Invention

The present invention relates to an inverter control circuit, and more particularly, to an apparatus for controlling power factor compensation and method thereof, in which a delay of a turn-on timing point of a power factor compensation switch is controlled to enhance a power factor.

2. Discussion of the Related Art

Generally, an air conditioner is a home appliance for maintaining a room air optimal to its usage and purpose. For instance, the air conditioner controls the room air to provide a cooling state to a room in summer or a heating state to the room in winter. The air conditioner adjusts humidity within the room. And, the air conditioner refines the room air into a clean and pleasant state.

As convenient home appliances such as the air conditioner propagate to become popular in use, the user's demand for high energy efficiency, performance enhancement, and convenience of the products rises.

Moreover, as home appliances and electronic devices are popular in home, companies, and factories, many countries regulate the product standards in many aspects. For instance, the harmonic standard regulates to restrict an amount of distorted frequencies. As harmonic hindrance accelerates degradation of various power devices, their endurances are shortened, the danger of fire due to overheating and the like is aggravated, and null power increases to waste power consumption.

In order to solve the above problem, an inverter air conditioner performs various kinds of controls for power factor enhancement to lower the harmonic hindrance.

A power factor enhancement circuit of a general inverter air conditioner is explained as follows.

FIG. 1 is a diagram of a power factor enhancement circuit of a general inverter air conditioner according to a related art.

Referring to FIG. 1, a power factor enhancement circuit of a general inverter air conditioner according to a related art consists of a reactor 102 displaying reactance passing a specific frequency among an input AC power 101, a rectifier 103 having a bridge diode 104 and smoothing capacitors C1 to C3 to convert AC power to DC power, an inverter 105 inverting DC power to AC power to drive a motor 106, an input current detector 107 detecting an input current, a zero crossing detector 108 detecting a zero crossing point of the input AC power 101, a DC link voltage detector 109 detecting a rectified DC voltage, a power factor compensator 110 controlling power factor compensation by a power factor compensation control signal, and a microcomputer 120 controlling the inverter 105 using data detected from the input current detector 107, the zero crossing detector 108, and the DC link detector 109 and controlling a power factor compensation switch to turn on/off.

The power factor compensator 110 consists of a bridge diode 111 connected to an input AC link and a power factor compensation switch 112 connected to the bridge diode 111 to actively vary a harmonic noise and an output voltage by controlling a switch-on/off by the power factor compensation control signal. The power factor compensation switch 112 uses an IGBT (insulated fate bipolar transistor) module for example.

An operation of the above-configured power factor enhancement circuit of the related art inverter control circuit is explained with reference to the drawing as follows.

Referring to FIG. 1, once the power factor enhancement circuit is driven, the AC power 101 is rectified by the bridge diode 104 of the rectifier 103 via the reactor 102, is smoothened by the smoothing capacitors C1 to C3, and is then outputted as the DC power. The DC power rectified in the rectifier 103 is converted to the AC power by the inverter 105 to be supplied as a drive power of the motor 106.

In doing so, the microcomputer 120 outputs a PWM (pulse width modulation) signal to an inverter driver (not shown in the drawing) to drive the inverter 105.

The input current detector 107 detects the input current. The zero crossing detector 108 detects the zero crossing point through a phase of the input current. And, the DC link voltage detector 109 detects the DC voltage of the DC link rectified by the rectifier 103.

In doing so, the microcomputer 120 receives the size of the input current detected by the input current detector 107, the zero crossing point of the input voltage detected by the zero crossing detector 108, and the DC link voltage detected by the DC link voltage detector 109.

The microcomputer 120 detects the phase of the input voltage and the DC voltage and then controls a switching operation of the power factor compensation switch 112 of the power factor compensator 110. For this, the microcomputer 120 commands a turn-on operation of the power factor compensation switch 112 in case that the phase of the input voltage meets the zero crossing point, whereby the power factor compensation switch 112 is turned on by the corresponding signal.

While the power factor compensation switch 112 is turned on, the input voltage is caught on the reactor 102 and the phase of the current passing through the reactor 102 linearly rises to be adjusted close to a phase of a voltage waveform. In doing so, the DC voltage rectified by the rectifier 103 is supplied to the motor 106 via the inverter 105.

FIG. 2 is a diagram of a waveform of an input current for turning on/off a power factor compensation switch, in which (a) indicates a phase of input voltage V and input current I, (b) represents a power phase detection waveform, and (c) indicates an on/off timing diagram of a power factor compensation switch.

Referring to FIG. 2, a power factor compensation switch (SW, IGBT) is turned on at a zero crossing timing point Pz of an input current I or input voltage V. Once a DC link voltage reaches a target voltage after turning on the power factor compensation switch, it is controlled that the power factor compensation switch is turned off to sustain its off-state until a zero crossing point of a next input voltage. The zero crossing timing points Pz according to the detection of the input power are divided by period. And, one switching operation is performed each period. In this case 'I' means an ideal input current waveform.

The on-operation of the power factor compensation switch 112 is repeated by taking the zero crossing timing point of the phase of the input voltage as a period. When the target DC link voltage becomes equal to a current DC link voltage after turning on the power factor compensation switch, the power factor compensation switch is turned off. In doing so, if the power factor compensation switch 112 is turned off, a voltage resulting from subtracting the input voltage from the output voltage is applied to the reactor 102 and the reactor current is linearly lowered to the contrary to the on-operation of the power factor compensation switch 112. The on-operation or off-operation of the power factor compensation switch is performed once each zero crossing timing point of the phase of the inputted voltage.

FIG. 3 is a flowchart of a power factor enhancement method in an inverter circuit according to a related art.

Referring to FIG. 3, the zero crossing timing point of the input voltage is detected by the zero crossing detector (S101). The power factor compensation switch (IGBT) is turned on at the detected zero crossing timing point of the input voltage (S103). The DC link voltage detected by the DC link voltage detector is then compared to the target DC voltage to find out whether the DC link voltage coincides with the target DC voltage (S105). If the DC link voltage coincides with the target DC voltage, the power factor compensation switch is turned off (S107). In doing so, the target DC link voltage is set to the DC link voltage providing the highest power factor is set to the target DC voltage.

However, since the switch of the power factor compensator is turned on at the zero crossing timing point of the power voltage, the related art puts limitation on the power factor enhancement. Namely, after the zero crossing time pint has been detected regardless of a load, the power factor compensation switch is turned on and off each uniform interval. Hence, it is unable to uniformly control the power factor for a wide operational range of the load, whereby the power factor enhancement is limited.

And, the related art power factor enhancement circuit is used for the purpose of power factor enhancement only and uses the DC voltage determined by the motor efficiency. Yet, operational efficiency is lowered in case of deviation from a motor design point despite being excellent at the rated voltage.

Moreover, if the DC voltage needed by the circuit is low, it may be difficult to control the DC voltage uniformly.

SUMMARY OF THE INVENTION

Accordingly, the present invention is directed to an apparatus for controlling power factor compensation and method thereof that substantially obviate one or more problems due to limitations and disadvantages of the related art.

An object of the present invention is to provide an apparatus for controlling power factor compensation and method thereof, in which a turn-on timing point of a power factor compensation switch is delayed by a prescribed time from a zero crossing timing point to enhance a power factor.

Another object of the present invention is to provide an apparatus for controlling power factor compensation and method thereof, by which a turn-on timing point of a power factor compensation switch can be adaptively controlled according to a load size in a manner of controlling a time delay value for the turn-on timing point of a power factor compensation switch in inverse proportion to the load size.

Another object of the present invention is to provide an apparatus for controlling power factor compensation and method thereof, by which a time delay value for a turn-on timing point of a power factor compensation switch can be down or up in case that a load amount is greater or smaller than a target value.

Another object of the present invention is to provide an apparatus for controlling power factor compensation and method thereof, in which a turn-of timing point of a power factor compensation switch is set to a case that a current DC link voltage reaches a target DC link voltage.

A further object of the present invention is to provide an apparatus for controlling power factor compensation and method thereof, in which a time delay value for a turn-on timing point of a power factor compensation switch can be lowered or raised if a current DC link voltage higher or lower than a target DC link voltage and by which a power factor can be enhanced via a re-established time delay value for the turn-on timing point of the power factor compensation switch according to lapse of a load driving time.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for controlling power factor compensation in an inverter control circuit according to the present invention includes a reactor passing a specific frequency among an inputted AC power, a rectifier converting AC power to DC power, an inverter inverting the DC power to AC power to control a drive of a motor, an input current detector detecting an input current, a zero crossing detector detecting a zero crossing point of the inputted AC power, a DC link voltage detector detecting the rectified DC voltage, a load amount detector detecting a current load amount within a system, a power factor compensator having a power factor compensation switch performing one switching-on operation each time point delayed by a prescribed time from the zero crossing time point by a power factor compensation signal to compensate a power factor of the power passing through the reactor, and a microcomputer receiving data detected by the input current detector, the zero crossing detector, and the DC link detector, the microcomputer detecting a turn-on time point of the power factor compensation switch delayed by the prescribed time from the zero crossing time point, the microcomputer outputting the power factor compensation signal to control a switching of the power factor compensation switch.

In another aspect of the present invention, in an inverter control circuit including a reactor displaying reactance of inputted AC power, a rectifier rectifying power passing the reactor, an inverter supplying the rectified power to a load, and a power factor compensation switch connected to the reactor to compensate a power factor, a method of controlling power factor compensation in the inverter control circuit includes the steps of periodically detecting a zero crossing time point of an inputted voltage, turning on the power factor compensation switch if a turn-on time point of the power factor compensation switch set to a time point delayed by a prescribed time from the detected zero crossing time of the inputted voltage is reached, and turning off the power factor compensation switch if a prescribed time passes after turning on the power factor compensation switch.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
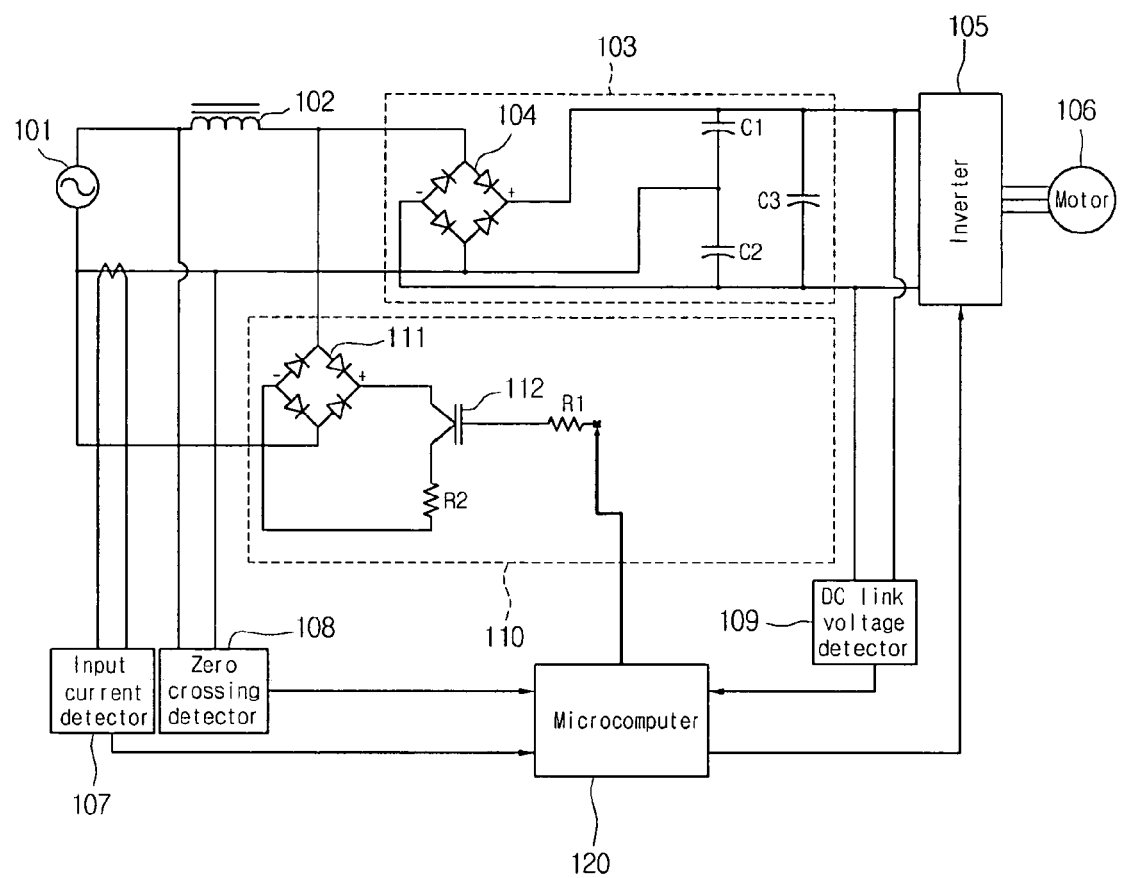
FIG. 1 is a diagram of a power factor enhancement circuit of a general inverter air conditioner according to a related art.
Figure 2:
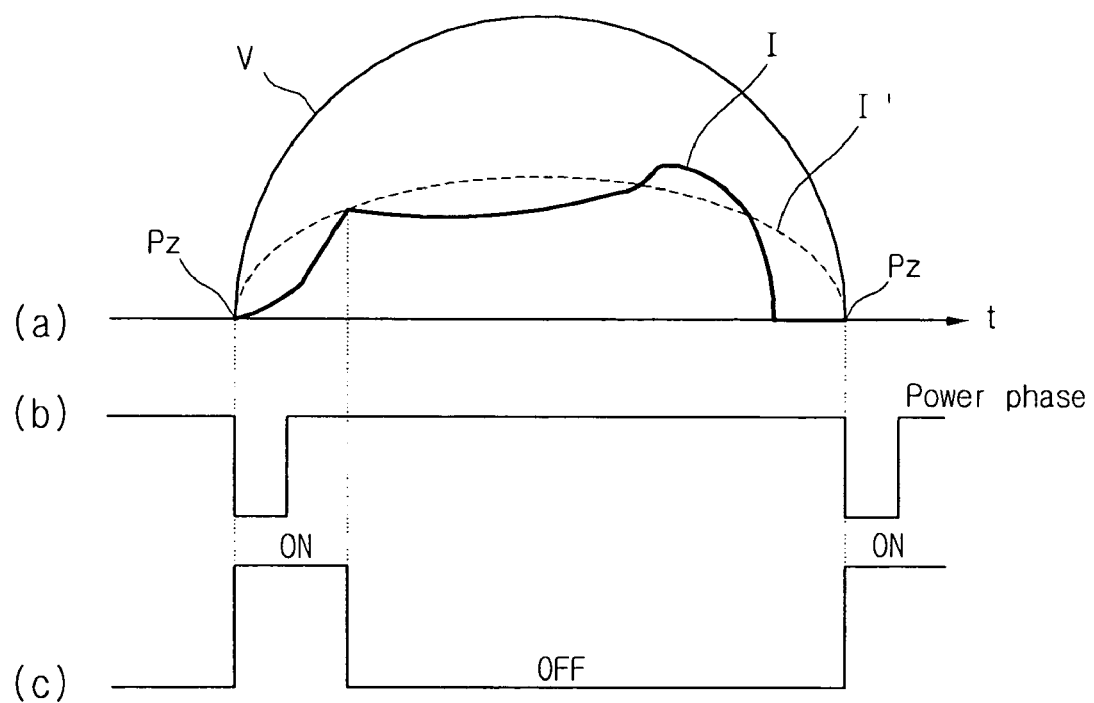
FIG. 2 is a diagram of a waveform of an input current and input voltage for turning on/off a power factor compensation switch.
Figure 3:
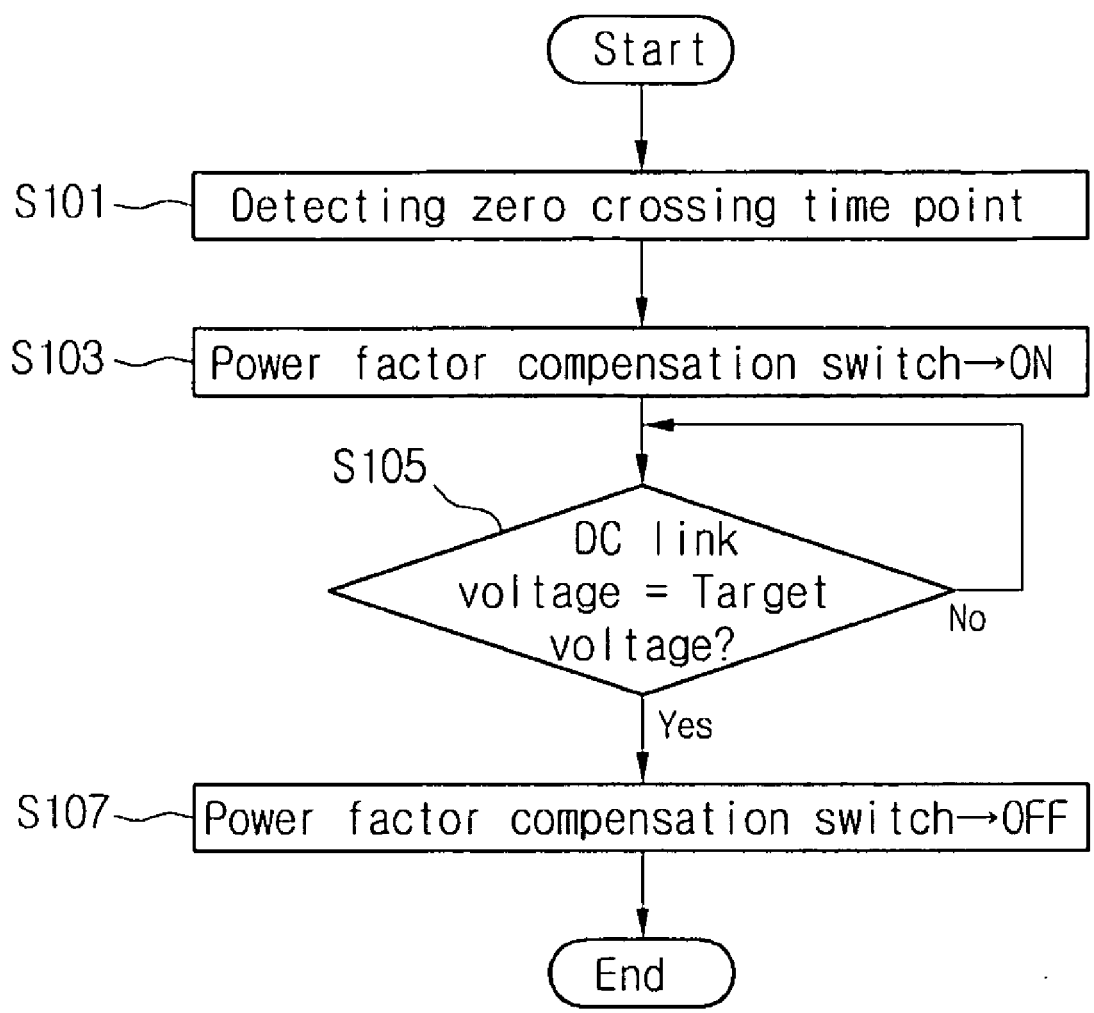
FIG. 3 is a flowchart of a power factor enhancement method in an inverter circuit according to a related art.
Figure 4:
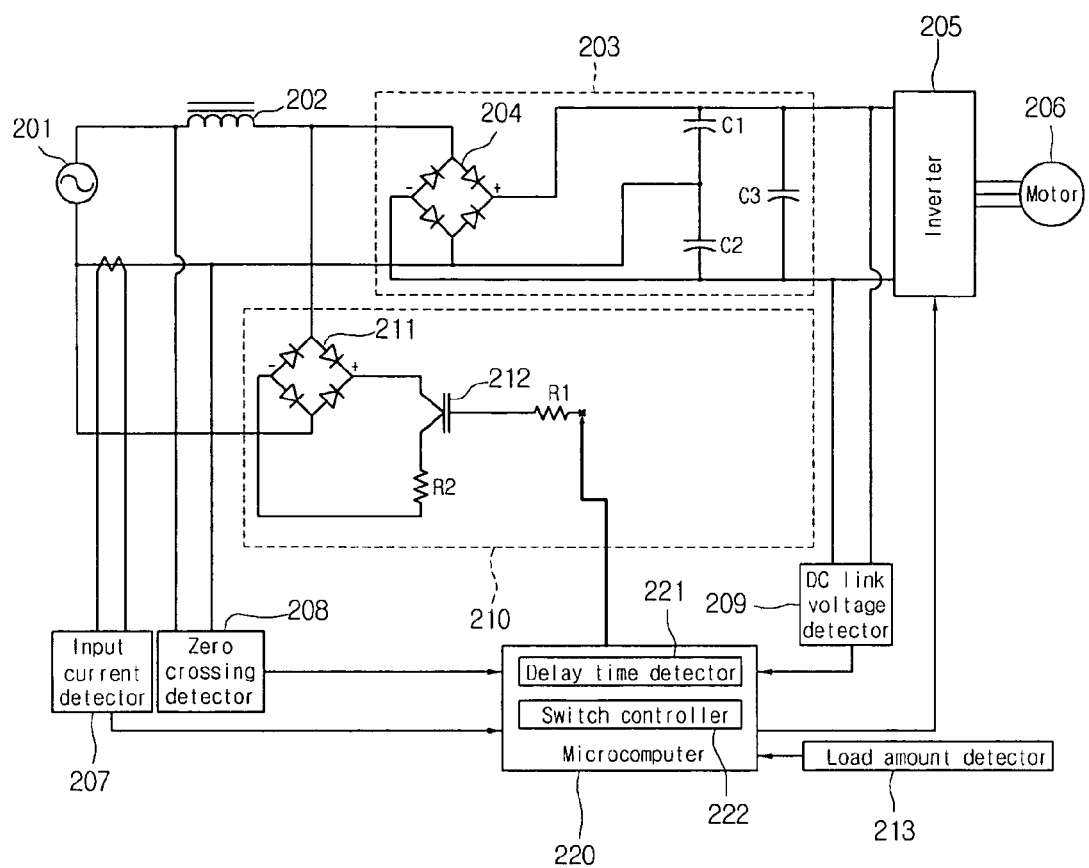
FIG. 4 is a block diagram of an apparatus for controlling power factor compensation in an inverter control circuit according to an embodiment of the present invention.

FIG. 4 shows a configuration of an inverter control circuit according to an embodiment of the present invention.

Referring to FIG. 4, an inverter control circuit according to the present invention includes a reactor 202 displaying reactance passing a specific frequency among an inputted AC power 201, a rectifier 203 having a bridge diode 204 and smoothing capacitors C1 to C3 to convert AC power to DC power, an inverter 205 inverting DC power to AC power to drive a motor 206, an input current detector 207 detecting an input current, a zero crossing detector 208 detecting a zero crossing point of the inputted AC power 201, a DC link voltage detector 209 detecting a rectified DC voltage, a load amount detector 213 detecting a load amount, a power factor compensator 210 turned on/off for power factor compensation, and a microcomputer 220 controlling the inverter 205 using data detected by the input current detector 207, the zero crossing detector 208, and the DC link detector 209 and controlling a power factor compensation switch 212 to turn on/off by a power factor compensation signal.

The power factor compensator 210 includes a bridge diode 211 connected to an input AC link and the power factor compensation switch 212 connected to the bridge diode 211 to actively vary a harmonic noise and an output voltage by controlling a switch-on/off by the power factor compensation control signal. The power factor compensation switch 212 uses an IGBT (insulated fate bipolar transistor) module for example.

And, the microcomputer 220 includes a delay time detector 221 detecting a delay time for a turn-on time point of the power factor compensation switch 212 and a switch controller 222 turning on/off the power factor compensation switch 212 by delaying the turn-on/off time from the zero crossing time point by the delay time value detected by the delay time detector 213. And, the delay time detector 221 and the switch controller 222 can be built in the microcomputer 220 or can be provided as an external separate module.

A power factor compensation apparatus of the inverter control circuit is explained with reference to FIG. 4 and FIG. 5 as follows.

Referring to FIG. 4, the inverter control circuit converts the AC power inputted to a product to the DC power using the rectifier 203, outputs an inverter control signal to an inverter driver (not shown in the drawing) to control the motor 206 of an inverter air conditioner via the inverter 205, and inserts a power factor control circuit to enhance a power factor.

In the power factor control circuit, the microcomputer 20 determines a turn-on time Ton of the power factor compensation switch 212 of the power factor compensator 210. For this, the microcomputer 220 receives data from the zero crossing detector 208, input current detector 207, DC link voltage detector 209, and load amount detector 213. Namely, the microcomputer 220 receives the zero crossing time point of an input voltage phase from the zero crossing detector 208, an input current size from the input current detector 207, a current DC link voltage detected by the DC link voltage detector 209, and a currently driven system or motor load amount detected by the load amount detector 213.

The load amount detector 213 can perform calculation using a current flowing in the motor as the motor load amount. Hence, the system load amount can be calculated since a system load amount difference occurs according to an outdoor temperature in cooling or heating mode due to the characteristics of the air conditioner. Moreover, a load variation amount in a compressor (not shown in the drawing) can be detected according to an input voltage.

The micro computer 220 uses the zero crossing time point of the inputted input voltage, the input current size, the DC link voltage, and the system load amount as information for the power factor compensation switch control. In doing so, a target DC link voltage is set to a DC link voltage having the highest power factor in the test stages of the respective products for the turn-on time pint control of the power factor compensation switch 212 for the power factor compensation of the microcomputer 220.

The microcomputer 220 is set up to enable the power factor compensation switch 212 to be turned on by a prescribed time delayed from the zero crossing time point. And, the turn-on time point and target DC voltage of the power factor compensation switch 212 are stored within the microcomputer 220.

Accordingly, if the prescribed time delayed from the zero crossing time point, i.e., if the setup delay time is detected by the delay time detector 221, the microcomputer 220 controls the switch controller 222 to operate the power factor compensator 210. In doing so, the power factor compensation switch 212 of the power factor compensator 210 is turned on by the power factor compensation signal outputted from the switch controller 222. In this case, the delay time detector 221 may include a timer for calculating the delay time. Once the current DC link voltage reaches the target DC link voltage, the microcomputer 220 turns off the power factor compensation switch 212 via the switch controller 222.

As the power factor compensation switch 212 is turned on/off according to the power factor compensation control signal, the power factor compensator 210 controls the input current connected to the input AC link by the bridge diode 211 to actively vary the harmonic noise and output voltage.

In performing the power factor compensation, one switching operation is executed each period centering on the zero crossing time point. Each time the power factor compensation is executed, the delay time for the turn-on time point of the power factor compensation switch is compensated according to a load variation.

Figure 5:
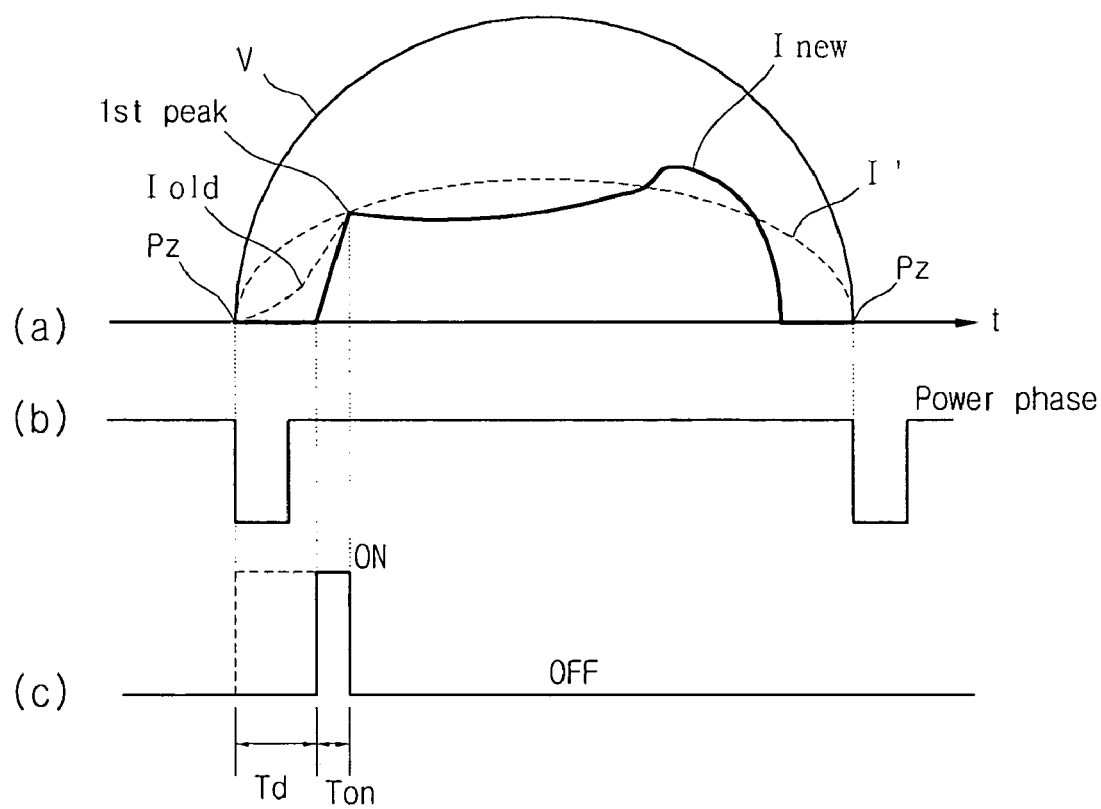
FIG. 5 is a diagram of a waveform of an input current and input voltage according to power factor compensation of an inverter control circuit of the present invention.

FIG. 5 is a diagram of a waveform of an input current and input voltage according to power factor compensation of an inverter control circuit of the present invention, in which (a) indicates a phase of input voltage V and input current Inew, (b) represents a power phase detection waveform, and (c) indicates an on/off timing diagram of a power factor compensation switch.

Referring to FIG. 5, after delaying a delay time Td from a zero crossing time point Pz of an input current Inew or input voltage V, a power factor compensation switch (SW, IGBT) it turned on. Hence, the input current Inew abruptly rises the moment the power factor compensation switch is turned on. Once a DC link voltage reaches a target voltage after turning on the power factor compensation switch, it is controlled that the power factor compensation switch is turned off to sustain its off-state until a delay time from a zero crossing point of a next input voltage. The zero crossing timing points Pz according to the detection of the input power are divided by period. And, one switching operation is performed each period. In this case 'I' means an ideal input current waveform and Iold is a previous input current waveform. And, $1^{st}$ peak is a first peak value of the input current.

The time Ton for turning on the power factor compensation switch is controlled by a turn-on time shorter than the previous. And, the turn-on time Ton of the power factor compensation switch is adaptively variable by the delay time Td varying according to a load.

Figure 6:
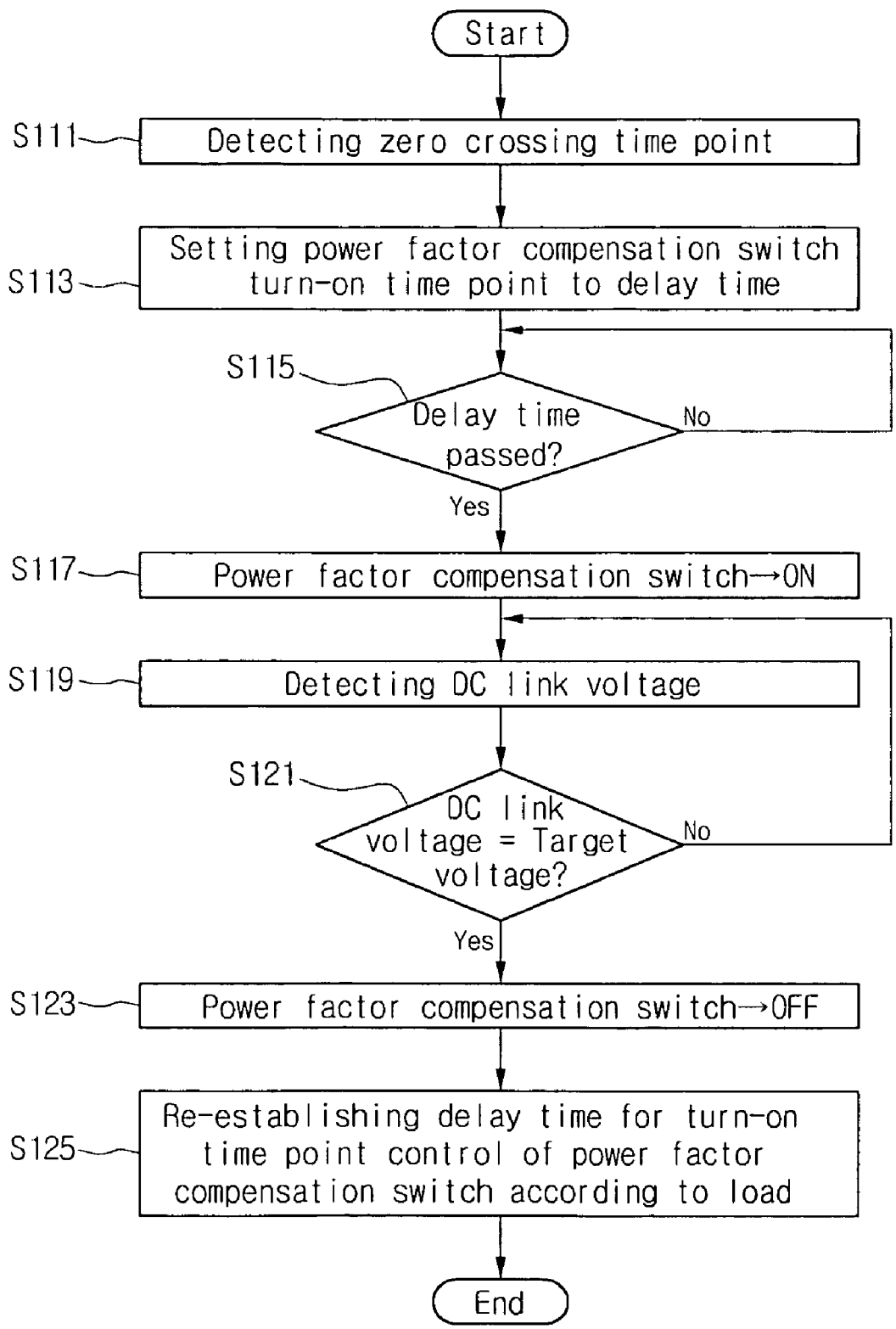
FIG. 6 is a flowchart of a method of controlling power factor compensation in an inverter control circuit according to one embodiment of the present invention.

A power factor compensation method in the inverter control circuit is explained in detail with reference to FIGS. 4 to 6 as follows.

First of all, once an operation is initiated under the control of the microcomputer 220, power is inputted to a product to be rectified by the rectifier 203 and is then smoothened by the smoothing capacitors C1 to C3. And, a high DC voltage is converted to an AC voltage via the inverter 205 to be supplied to the motor 206.

The DC link voltage detector 209 detects the DC link voltage generated from a DC link end to deliver to the microcomputer 220. And, the zero crossing detector 208 detects the zero crossing time point of the voltage inputted to the product to provide to the microcomputer (S101).

In doing so, a turn-on time point of the power factor compensation switch is set in the microcomputer 220 to a time delayed by a prescribed time from the zero crossing time point of the input voltage (S113). In this case, the delay time corresponds to a time between the zero crossing time point and the turn-on time point of the power factor compensation switch.

It is checked whether the delay time has passed using the zero crossing time point and the power factor compensation delay time for the switching drive of the power factor compensator 210 (S115). If the delay time for the switching drive has passed, the power factor compensation switch 212 of the power factor compensator 210 is turned on (S117). Namely, the time point of turning on the power factor compensation switch 212 o the power factor compensator 210 is delayed by the prescribed time from the zero crossing time point to control the drive.

While the power factor compensation switch 212 is turned on, the input voltage is applied to the reactor 202 and a phase of the current passing through the reactor 202 is abruptly raised linearly to be adjusted close to a phase of a voltage waveform. In doing so, the DC voltage smoothened by the rectifier 203 is supplied to the motor 206 via the inverter 205.

While the power factor compensation switch 212 is turned on, the microcomputer 220 compares the current DC link voltage detected by the DC link voltage detector 209 to the target DC link voltage to find out whether the current DC link voltage reaches the target DC link voltage (S119, S121).

If the current DC link voltage reaches the target DC link voltage, the power factor compensation switch 212 it turned of (S123). Once the power factor compensation switch 212 is turned off, a voltage resulting from subtracting the input voltage from the output voltage is caught on the reactor 202 and the reactor current is linearly lowered to the contrary of the turn-on operation of the power factor compensation switch 212. Since the power is supplied to the output form the input, the smoothing capacitors C1 to C3 are charged with energy and the energy is supplied to the motor 206.

The on/off operation of the power factor compensation switch 212 is performed in a manner of repeating one switching operation from the time point delayed by the prescribed time from the zero crossing time point of the input voltage in identifying a period of the input voltage centering on the zero crossing time point.

Once the power factor compensation switch 212 is turned off, the delay time is newly set up. The new delay time is re-established to control the delay time of the turn-on time of the power factor compensation switch 212 according to the load amount (S125).

In order to re-establish the new delay time, the microcomputer 220 re-establishes the delay time adaptively to the load size using the load current detected by the load amount detector 213, the size of the input current detected by the input current detector 207, and the like. For instance, the delay time for the turn-on time of the power factor compensation switch 212 is set inverse proportional to the load size.

Figure 7:
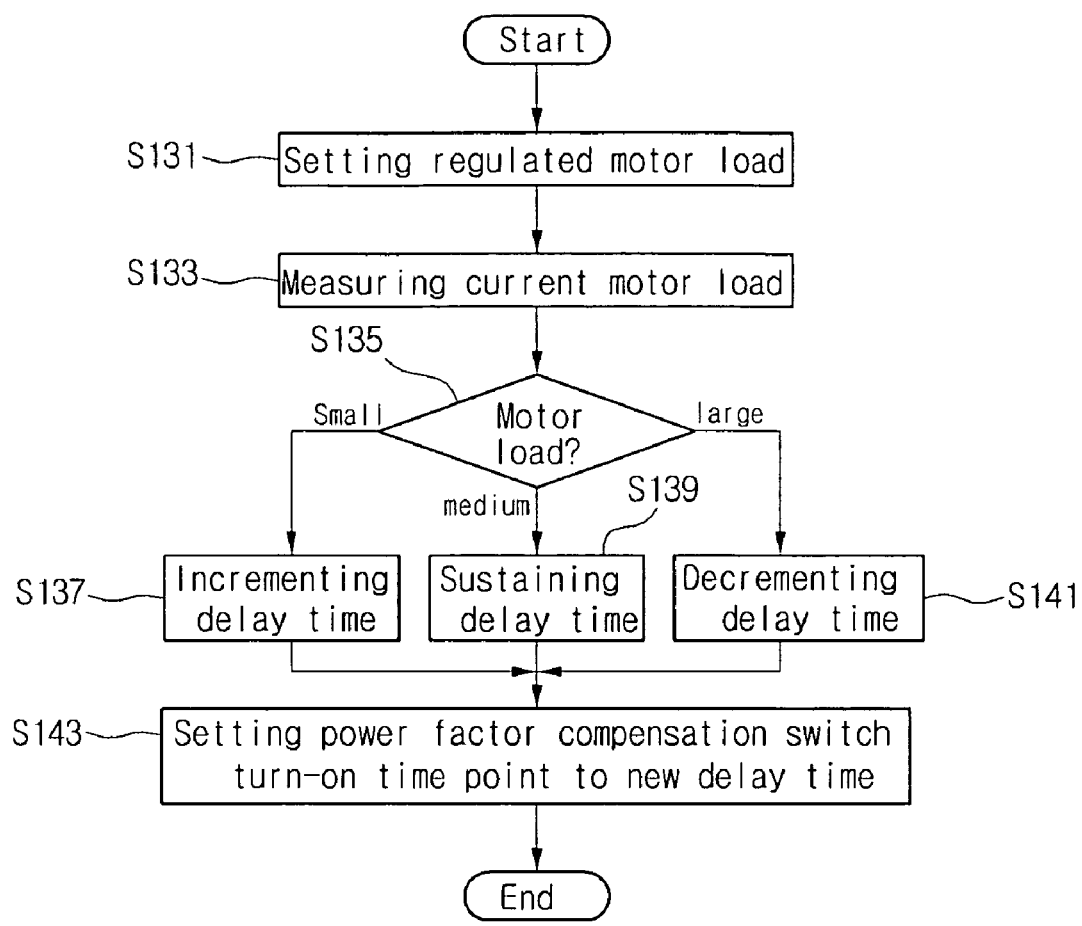
FIG. 7 is a flowchart of a method of controlling a power factor compensation switch according to a load amount in the present invention.

Meanwhile, a method of setting up the delay time for the turn-on time of the power factor compensation switch is explained in detail with reference to FIG. 7 as follows.

First of all, the load amount of the regulated motor is set up (S131). Subsequently, power is supplied to the system to drive and the motor load amount is measured via the load amount detector (S133).

In doing so, the currently measured load amount of the motor is compared to a reference (S135). Namely, the load amount of the motor is compared to the reference to decide whether it is greater or smaller than the reference.

If the load amount of the motor is smaller than the reference, i.e., if the motor load is small, the delay time for the turn-on time of the power factor compensation switch is incremented in a manner of raising up (+) the previously setup value (S137). Hence, the turn-on time of the power factor compensation switch is delayed to operate by the increment of the time from the zero crossing time point. Preferably, the delay time is increased to the previously set delay time.

If the load amount of the motor lies within the reference, i.e., if the motor load is medium, the previously set value is used as the delay time for the turn-on time of the power factor compensation switch (S139). In this case, the turn-on time of the power factor compensation switch is determined as the previously set value or the initially set value.

If the load amount of the motor exceeds the reference, i.e., if the motor load is large, the delay time for the turn-on time of the power factor compensation switch is determined in a manner of decrementing (−) the previously set value (S141). In this case, the turn-on time of the power factor compensation switch operates as early as the decremented time from the zero crossing time point.

Thus, by re-establishing the turn-on time of the power factor compensation switch by the new delay time according to the motor load, the delay time for the turn-on time of the power factor compensation switch is delayed by the prescribed time later than the zero crossing time point to turn on the power factor compensation switch (S143).

In case of detailing the turn-on time point to control the drive time of the power factor compensation switch for the motor load variation more adaptively, it is able to re-establish the more precise delay time and to cope with the turn-on time of the power factor compensation switch more adaptively. Hence, the power factor compensation can be more enhanced.

Moreover, in order to re-establish the delay time for the turn-on time of the power factor compensation switch, the present invention measures the load current introduced into the air conditioner and the power consumption according to the input voltage and adjusts the delay time of the power factor compensation switch according to a size of the power consumption, thereby compensating the power factor via the delay of the turn-on time of the power factor compensation switch.

Hence, the re-establishment range of the delay time of the power factor compensation switch can be varied according to various kinds of parameters (current, power, etc.) for measuring the motor load. The power factor can be evenly controlled in a wide operational area. The current flow unnecessary for the power factor compensator is cut off to reduce a circuit loss. The motor can be economically driven by securing the efficiency in a light load area and a rated load area. And, high performance can be provided by securing the operational capability of the motor in a heavy load area.

Figure 8:
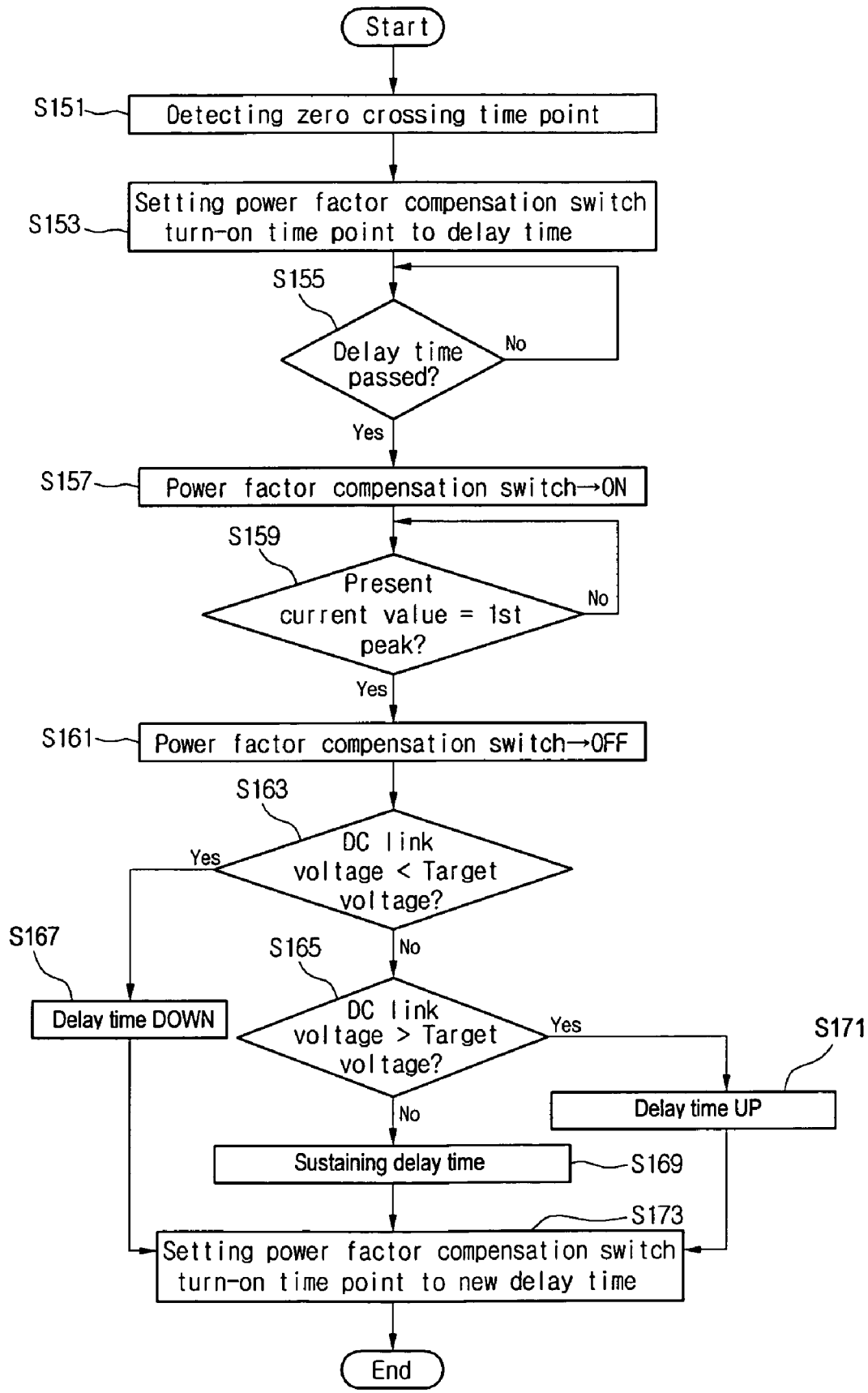
FIG. 8 is a flowchart of a method of controlling power factor compensation in an inverter control circuit according to another embodiment of the present invention.

FIG. 8 is a flowchart of a method of controlling power factor compensation in an inverter control circuit according to another embodiment of the present invention.

Referring to FIG. 8, once the zero crossing time point is detected by the zero crossing detector 208 according to the input voltage (S151), the delay time for determining a delay of the turn-on time point of the power factor compensation switch 212 is set (S153). In doing so, the delay time is set to a power factor enhancement value at a minimum motor load and corresponds to a time from the zero crossing time point to the turn-on time point of the power factor compensation switch.

It is then checked whether the delay time for the turn-on time of the power factor compensation switch has passed in the step S153 (S155). In case that the delay time has passed, the power factor compensation switch 212 is turned on for power factor compensation (S157).

While the power factor compensation switch 212 is turned on, the input voltage is applied to the reactor 202 and a phase of the current passing through the reactor 202 is abruptly raised linearly to be adjusted close to a phase of a voltage waveform. In doing so, the DC voltage rectified by the rectifier 203 is supplied to the motor 206 via the inverter 205. The turn-on operation of the power factor compensation switch 212 is actuated at the time point where the phase of the input voltage is delayed by the prescribed time from the zero crossing time.

Subsequently, it is decided whether a current value currently detected by the input current detector 207 reaches a first peak value (S159). If the currently detected current value, as shown in FIG. 5, reaches the first peak value, the power factor compensation switch is turned off (S161).

In doing so, a presence or non-presence of the peak arrival of the currently detected current depends on about 15% of the peak value calculated with the currently detected current value. If the power factor compensation switch 212 is turned off, a voltage resulting from subtracting the input voltage from the output voltage is applied to the reactor 202 and the reactor current is linearly lowered to the contrary to the turn-on operation of the power factor compensation switch 212.

Thus, the time point of turning on the power factor compensation switch 212 is delayed by the prescribed time from the zero crossing time point to turn on the power factor compensation switch 212. And, the power factor compensation switch 212 is turned off in case of the arrival at the first peak value. Hence, the power factor compensation switch 212 repeats such a turn-on/off operation.

Once the power factor compensation switch 212 is turned of, the DC link voltage detected by the DC link voltage detector 209 is compared to a predefined target voltage (S163, S165). If the DC ink voltage is smaller than the target voltage, the delay time is lowered (Down) (S167). If the DC ink voltage is higher than the target voltage, the delay time is raised (Up) (S171). If the DC ink voltage is equal to the target voltage, the delay time is sustained (S169). In case of incrementing/decrementing the delay time, the turn-on time point of the power factor compensation switch is set to a new delay time (S173).

Namely, if the target DC link voltage is higher than the current DC link voltage, the delay time for the turn-on time of the power factor compensation switch is set shorter. If the target DC link voltage is lower than the current DC link voltage, the delay time for the turn-on time of the power factor compensation switch is set longer. And, the DC link voltage is incremented/decremented via feedback control to fit a prescribed level.

As mentioned in the foregoing description of the apparatus and method of the present invention, the power factor compensation switch is turned on not at the zero crossing time point but at the prescribed delayed time point, whereby the turn-on time point of the power factor compensation switch can be controlled according to the load size and whereby the power factor can be enhanced adaptively to the load amount.

Moreover, the power factor can be evenly controlled in a wide operational area. The current flow unnecessary for the power factor compensator is cut off to reduce a circuit loss. The motor can be economically driven by securing the efficiency in a light load area and a rated load area. And, high performance can be provided by securing the operational capability of the motor in a heavy load area.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus, comprising:
 a reactor which passes a specific frequency among an input AC power;
 a rectifier which converts the input AC power to a DC power;
 an inverter which inverts the DC power to an AC power to control a drive of a load;

an input current detector which detects an input current of the input AC power;

a zero crossing detector which detects a zero crossing point of the input AC power;

a DC link voltage detector which detects a rectified DC voltage of the DC power;

a power factor compensator which compensates a power factor of the power passing through the reactor; and a microcomputer which receives data detected by the input current detector, the zero crossing detector, and the DC link voltage detector, the microcomputer turning on the power factor compensator when a delay time, counting from the zero crossing time point, passes, the microcomputer turning off the power factor compensator when the input current of the input AC power detected by the input current detector reaches a first peak value, the microcomputer adjusting the delay time if the rectified DC voltage detected by the DC link voltage detector when the microcomputer turns off the power factor compensator is higher or lower than a target voltage.

2. The apparatus of claim 1, further comprising a load amount detector which detects a current load amount of the load.

3. The apparatus of claim 2, further comprising a delay time detector which adjusts the delay time according to the current load amount of the load detected by the load amount detector.

4. The apparatus of claim 3, wherein a turn-on time point of the power factor compensator is variable according to adjustment of the delay time.

5. The apparatus of claim 3, wherein the delay time detector decreases the delay time if the load amount of the load increases and wherein the delay time detector increases the delay time if the load amount of the load decreases.

6. The apparatus of claim 2, wherein the microcomputer decreases the delay time if the DC voltage detected by the DC link voltage when the microcomputer turns off the power factor compensator is lower than the target voltage, and the microcomputer increases the delay time if the DC voltage detected by the DC link voltage detector when the microcomputer turns off the power factor compensator is higher than the target voltage.

7. The apparatus of claim 1, wherein the microcomputer decreases the delay time if the DC voltage detected by the DC link voltage detector when the microcomputer turns off the power factor compensator is lower than the target voltage, and the microcomputer increases the delay time if the DC voltage detected by the DC link voltage detector when the microcomputer turns off the power factor compensator is higher than the target voltage.

8. In an inverter control circuit including a reactor displaying reactance of input AC power, a rectifier rectifying power passing the reactor, an inverter supplying the rectified power to a load, and a power factor compensator connected to the reactor to compensate a power factor, a method of controlling power factor compensation in the inverter control circuit, comprising the steps of:

periodically detecting a zero crossing time point of an input voltage of the input AC power;

turning on the power factor compensator when a delay time, counting from the detected zero crossing time of the input voltage, passes;

turning off the power factor compensator when an input current of the input AC power reaches a first peak value; and adjusting the delay time if a DC voltage rectified from the input AC power when the power factor compensator is turned off is higher or lower than a target voltage.

9. The method of claim 8, wherein the delay time is increased if the DC voltage rectified from the input AC power is lower than the target voltage or is decreased if the DC voltage rectified from the input AC power is higher than the target voltage.

10. An apparatus for controlling a power factor compensator in an inverter control circuit, comprising:

a zero crossing detector which detects a zero crossing point of a voltage provided by an input AC power;

an input current detector which detects a current provided by the input AC power;

a DC link voltage detector which detects a DC voltage rectified from the voltage provided by the input AC power; and a microcomputer connected to the zero crossing detector, the input current detector and the DC link voltage detector, the microcomputer turning on the power factor compensator when a delay time, counting from the zero crossing time point detected by the zero crossing detector, passes, the microcomputer turning off the power factor compensator when the input current of the input AC power detected by the input current detector reaches a first peak value, the microcomputer adjusting the delay time if the rectified DC voltage detected by the DC link voltage detector when the microcomputer turns off the power factor compensator is higher or lower than a target voltage.

* * * * *